United States Patent
Payne

(10) Patent No.: US 10,094,416 B2
(45) Date of Patent: Oct. 9, 2018

(54) PIVOT PIN ASSEMBLY FOR SHAKER HEAD

(71) Applicant: David Payne, Shafter, CA (US)

(72) Inventor: David Payne, Shafter, CA (US)

( * ) Notice: Subject to any disclaimer, the term of this patent is extended or adjusted under 35 U.S.C. 154(b) by 117 days.

(21) Appl. No.: 15/237,092

(22) Filed: Aug. 15, 2016

(65) Prior Publication Data

US 2017/0292561 A1    Oct. 12, 2017

Related U.S. Application Data

(60) Provisional application No. 62/319,447, filed on Apr. 7, 2016.

(51) Int. Cl.
*F16C 11/04* (2006.01)
*A01D 46/26* (2006.01)

(52) U.S. Cl.
CPC .............. *F16C 11/04* (2013.01); *A01D 46/26* (2013.01)

(58) Field of Classification Search
CPC .............. A01D 46/26; A01D 2046/262; A01D 2046/266; F16C 11/04
See application file for complete search history.

(56) References Cited

U.S. PATENT DOCUMENTS

| | | | |
|---|---|---|---|
| 3,596,972 A | 8/1971 | Pool | |
| 3,964,244 A * | 6/1976 | Vallicella | A01D 46/26 56/329 |
| 4,194,347 A * | 3/1980 | Peters | A01D 46/26 56/329 |
| 4,776,217 A | 10/1988 | Nolan | |
| 5,406,780 A | 4/1995 | Laserson et al. | |
| 5,413,453 A | 5/1995 | Hill | |
| 5,489,008 A * | 2/1996 | Hill | A01D 46/26 184/100 |
| 5,653,097 A * | 8/1997 | Hill | A01D 46/26 56/328.1 |
| 6,938,403 B2 | 9/2005 | Suter et al. | |
| 7,757,471 B2 | 7/2010 | Mayo | |
| 7,918,078 B2 | 4/2011 | Poggiagliolmi et al. | |
| 9,072,224 B1 | 7/2015 | Flora et al. | |

(Continued)

FOREIGN PATENT DOCUMENTS

WO    WO-2009060115 A2 *   5/2009   ............ A01D 46/26

*Primary Examiner* — Arpad Fabian-Kovacs
(74) *Attorney, Agent, or Firm* — James M. Duncan, Esq.; Klein DeNatale Goldner

(57) ABSTRACT

A pivot pin assembly for a tree shaker pivotally attaches the clamping arm to the stationary arm. Each end of the cylindrical pivot pin extends outside of a cylindrical bore of the clamping arm. A longitudinal load member extends through an aperture in the stationary arm and into an aperture in the cylindrical pivot pin. An axial load may be applied to the longitudinal load member which compresses a plate of the stationary arm against the cylindrical pivot pin, but without compressing the stationary arm against the clamping arm. This configuration allows substantial torque to be applied to the longitudinal load member, which reduces play between the stationary arm and the clamping arm without inhibiting the free rotation of the clamping arm. Application of this torque eliminates radial and vibratory movement in the shaker head, which otherwise cause damage to the components of the shaker head.

24 Claims, 10 Drawing Sheets

(56) References Cited

U.S. PATENT DOCUMENTS

| | | | |
|---|---|---|---|
| 2002/0029551 A1* | 3/2002 | Tenias Sancho | A01D 46/26 56/340.1 |
| 2004/0079065 A1* | 4/2004 | Zehavi | A01D 46/26 56/340.1 |
| 2004/0112035 A1 | 6/2004 | Suter et al. | |
| 2008/0016838 A1* | 1/2008 | Pellenc | A01D 46/26 56/340.1 |
| 2009/0085364 A1 | 4/2009 | Pellenc et al. | |
| 2010/0095644 A1* | 4/2010 | Mayo | A01D 46/26 56/10.2 R |
| 2016/0219786 A1* | 8/2016 | Needham | A01D 46/26 |
| 2016/0219787 A1* | 8/2016 | Needham | A01D 46/26 |

\* cited by examiner

PIVOT PIN ASSEMBLY FOR SHAKER HEAD

RELATED APPLICATIONS

THIS APPLICATION CLAIMS PRIORITY TO PROVISIONAL PATENT APPLICATION NO. 62/319,447 FILED ON Apr. 7, 2016

BACKGROUND OF THE INVENTION

The present invention relates generally to tree shakers for harvesting nuts, fruits, and other tree-borne crops, and more specifically to an improved tree shaker head having an improved pivot assembly for connecting the clamping arm to the frame, which includes an integral stationary arm.

Tree shakers are known in the art for harvesting nuts, fruits, and other tree-borne products. Shakers typically employ a boom extending forwardly from a tractor or other device, with a shaker head present at the end of the boom for grasping a tree and imparting a shaking force to the tree. The shaker head comprises a clamping arm and a frame having an integral stationary arm, with the clamping arm pivotally attached to the frame by a pivot pin assembly.

The shaker head is positioned around a tree and when the hydraulically actuated ram on the clamp cylinder is energized the clamping arm pivots toward the stationary arm thereby causing pads on the inside of the shaker head to compress and conform round the trunk. The hydraulic system then sequences from the clamping circuit to the shaking circuit, launching the shaker head into a vigorous shaking pattern during which the crop of fruit or nuts rains down in a cloud of dust and debris. When the shake control is released dynamic braking is applied and the shaker head brakes hard to a stop. The shaker head is then unclamped and the unit moves onto another tree. This process is repeated, often several times a minute depending upon the tree spacing and operator until all trees in the orchard have been shaken. The shaking action of the device dislodges fruits, nuts, and other products, which then fall from the branches of the tree to be harvested. The shaking action is aggressive, with severe loads imparted to various components of the device, particularly within the shaker head.

The commonly used tree shaker typically comprises a frame having a hollow welded steel case structure which contains the drive sheave, drive belt, two or more eccentric rotating masses, one or more hydraulic cylinders which open and close the arms of the tree shaker and hydraulic hose routings. A hydraulic motor for driving the eccentric rotating masses typically mounts within or on the top of the case structure and is connected to a drive pulley. The frame has a stationary arm which is either affixed to the frame or is integral to the frame. Opposing the stationary arm is a clamping arm which attaches to the rear of the frame by a pivot pin. The clamping arm and the stationary arm apply a compressive force during the shaking process when a hydraulic cylinder is actuated, causing the clamp arm to pivot about the pivot pin and move toward the stationary arm, causing the clamping arm and stationary arm to close about a tree trunk. Once the arms of the head are closed about the tree trunk, vibration is initiated within the shaker head. Typically the shakers use stacked counter rotating eccentric mass energy wheels to generate the vibration or pulse, which is created by the rotation of an eccentric mass about a fixed common shaft.

It is to be appreciated that the various components of the shaker head are subjected to significant loading during the above described process, which is repeated almost immediately and repeatedly. In each sequence all components of the shaker head are twisted into alignment. As a result of this repeated sequence, various shaker head components are continually stressed and subject to wear and failure. The inventor herein has found that the pivot pin components and supporting structures are particularly subject to fatigue, wear, and failure as a result of the repeated and significant loading during operation of the shaker head.

The pivot pin, as well as the surrounding structure of the stationary arm and the clamp arm, are subjected to repeated cycles of loading and unloading during the vibration cycle. Because of the inevitable misalignment of the clamping arm with the stationary arm as the head repeatedly engages trees, the structural components at the pivot assembly of the clamping arm frame/stationary arm are subjected to tensional, compressional, and torsional loads. Given the severity and frequency of the imposed loads, it is not uncommon for the pivot pin bushings to pull completely through the structural plate of the stationary arm in less than a season of use of the shaker.

SUMMARY OF THE INVENTION

Embodiments of the present invention address the problem identified above. Embodiments of the invention are utilized in shaker heads of the type having a clamping arm and a stationary arm, where the stationary arm extends from or is integral to a frame comprising a case structure which generally contains a drive sheave, a drive belt, at least one eccentric rotating mass, a hydraulic motor mounted to the case structure, a stationary arm affixed to the case structure, and a clamping arm in opposite relation to the stationary arm. The clamping arm is pivotally attached to the case structure. At least one hydraulic actuator is connected between the case structure and the clamping arm, where the hydraulic actuator causes the clamping arm to open and close with respect to the stationary arm, thereby providing the clamping force for locking the shaker head around a tree trunk.

The clamping arm has a free end and a fixed end, where the free end moves relative to the stationary arm and the fixed end is attached to the frame, at what will be designated as the "pivot end" of the clamping arm. The frame and clamping arm may each have a similar case structure. In this configuration, the frame has an upper plate and a lower plate, with the upper plate and the lower plate in opposite facing relation with a cavity defined there between for placement of operational components. The clamping arm, which has a top surface and a bottom surface, is sandwiched between the upper plate and lower plate of the frame, with the fixed end of the clamping arm rotational about the pivot pin. In the embodiments of the present invention, the pivot pin does not rotate with the clamping arm, but rather the clamping arm rotates about the pivot pin.

The upper plate and lower plate of the frame have apertures of equal diameter penetrating completely through each plate, with the apertures in opposite facing relation. Likewise, the top surface and the bottom surface of the clamping arm have apertures of equal diameter penetrating completely through the clamping arm. In the embodiment depicted in the figures herein, the clamping arm has a cylindrical housing at the fixed end of the clamping arm where a continuous aperture extends through the clamping arm thereby defining a cylindrical bore. However, as an alternative embodiment, the clamping arm may have a case structure having two parallel plates, in which case each of the plates would have an aperture in opposite facing relation with an aperture in the opposing plate, where the alignment of the opposing apertures would define the cylindrical bore.

The apertures of the frame are in axial alignment with the apertures of the clamping arm, but the apertures of the plates of the frame will have a smaller diameter than the apertures of the pivot arm so that the apertures in the clamping arm can accommodate the relatively large diameter of the pivot pin while the smaller apertures in the upper plate and lower plate will allow pins, fasteners, or other longitudinal load members to extend through the upper plate and lower plate and attach to the pivot pin, but will not allow passage of the large diameter pivot pin.

The fixed end of the clamping arm is pivotally attached by the pivot pin at the pivot end of the frame between the upper plate and the lower plate of the frame. The upper plate and lower plate, fabricated from steel, will typically have a wall thickness of approximately ¾ inch.

The pivot pin is a cylindrical steel pin having a first end and a second end, with the cylindrical steel pin sized to be disposed into the cylindrical bore defined by the apertures in the clamping arm. The cylindrical steel pin will have an outside diameter which is substantially larger than the pivot pins currently in use. For example, in one embodiment of the present invention, the pivot pin has a diameter of approximately 4½ inches, as compared to the existing pivot pins which are usually 1¼ to 1½ inch in diameter.

The cylindrical pivot pin has a length such that when the cylindrical steel pin is disposed into the cylindrical bore the first end extends above the top surface of the clamping arm and the second end extends below the bottom surface of the clamping arm, but neither end of the steel cylindrical pin extends into the apertures of the upper plate and the lower plate, which apertures could not receive the pivot pin anyway, because the apertures of the upper plate and the lower plate have a smaller diameter than the outside diameter of the pivot pin.

Embodiments of the invention may utilize a pivot pin having either a continuous aperture extending through the longitudinal axis from the first end to the second end. Alternatively, each end of the pivot pin may have an axially aligned threaded aperture, where each threaded aperture is sufficiently long for a threaded fastener to be inserted and torque applied as discussed below.

In embodiments of the invention in which the pivot pin has a continuous aperture extending through the longitudinal axis of the pivot pin, a longitudinal load member extends through the upper aperture of the upper plate, extends through the continuous aperture of the pivot pin, and extends through the lower aperture of the lower plate. The longitudinal load member may comprise threaded ends, such that a nut may be made up on either end of the longitudinal load member, and torque applied to the nuts. Alternatively, one end of the longitudinal load member may be secured with a nut and the other end secured on the outside of the lower plate (or upper plate) by some other retaining means, such as a pin inserted through an aperture extending diametrically through an end of the longitudinal load member, a welded washer or plate attached at one end of the longitudinal load member, a retaining clip or a taper bushing which attaches to an end of the longitudinal load member. Alternatively, one end or both ends of the longitudinal load member may have a threaded aperture which receives a threaded fastener.

In all of the embodiments of the invention, application of substantial torque to the longitudinal load member compresses the upper plate and lower plates of the frame against the cylindrical steel pin without compressing the clamping arm because the cylindrical pivot pin is essentially non-compressible.

In embodiments of the invention in which threaded fasteners are made up into threaded apertures at each end of the pivot pin, a first threaded fastener extends through the upper aperture of the upper plate and is made up into a first threaded aperture at the first end of the pivot pin. Likewise, a second threaded fastener extends through the lower aperture of the lower plate and makes up into the second threaded aperture at the second end. As with the first threaded fastener, application of substantial torque to the second threaded fastener compresses against the lower plate against cylindrical steel pin without compressing the bottom plate of the clamping arm. The first threaded fastener and the second threaded fastener generally have the same diameter as the pivot pins currently in use, typically ranging from 1¼ to 1½ inch. The cylindrical bore will typically have a wear bushing (or bushings) where there is sufficient clearance between the pivot pin and the inside walls of the wear bushings to allow rotation of the clamping arm about the pivot pin without movement of the pivot pin. A clearance ranging from 0.002 to 0.004 inches between the wear bushings and the pivot pin is acceptable. The wear bushing will typically be fabricated from a softer material, such as brass, and will have a wall thickness ranging from ⅛ to ¼ inch. The wear bushing will typically be press fit into the cylindrical bore of the clamping arm.

As a result of the design of the various embodiments described herein, substantial torque may be applied to the longitudinal load member and thereby reduce play between the clamping arm and stationary arm. However, application of the torque does not inhibit the free rotation of the clamping arm about the pivot pin and with respect to the stationary arm. The inventor herein has found that approximately 2650 lb-ft torque may be applied to embodiments of the pivot pin (equating to 142,000 psi on each side of the pin). The practical result of applying this torque is to increase the structural strength of the entire shaker head by, among other means, eliminating radial and vibratory movement.

DETAILED DESCRIPTION OF THE INVENTION

Figure 1:
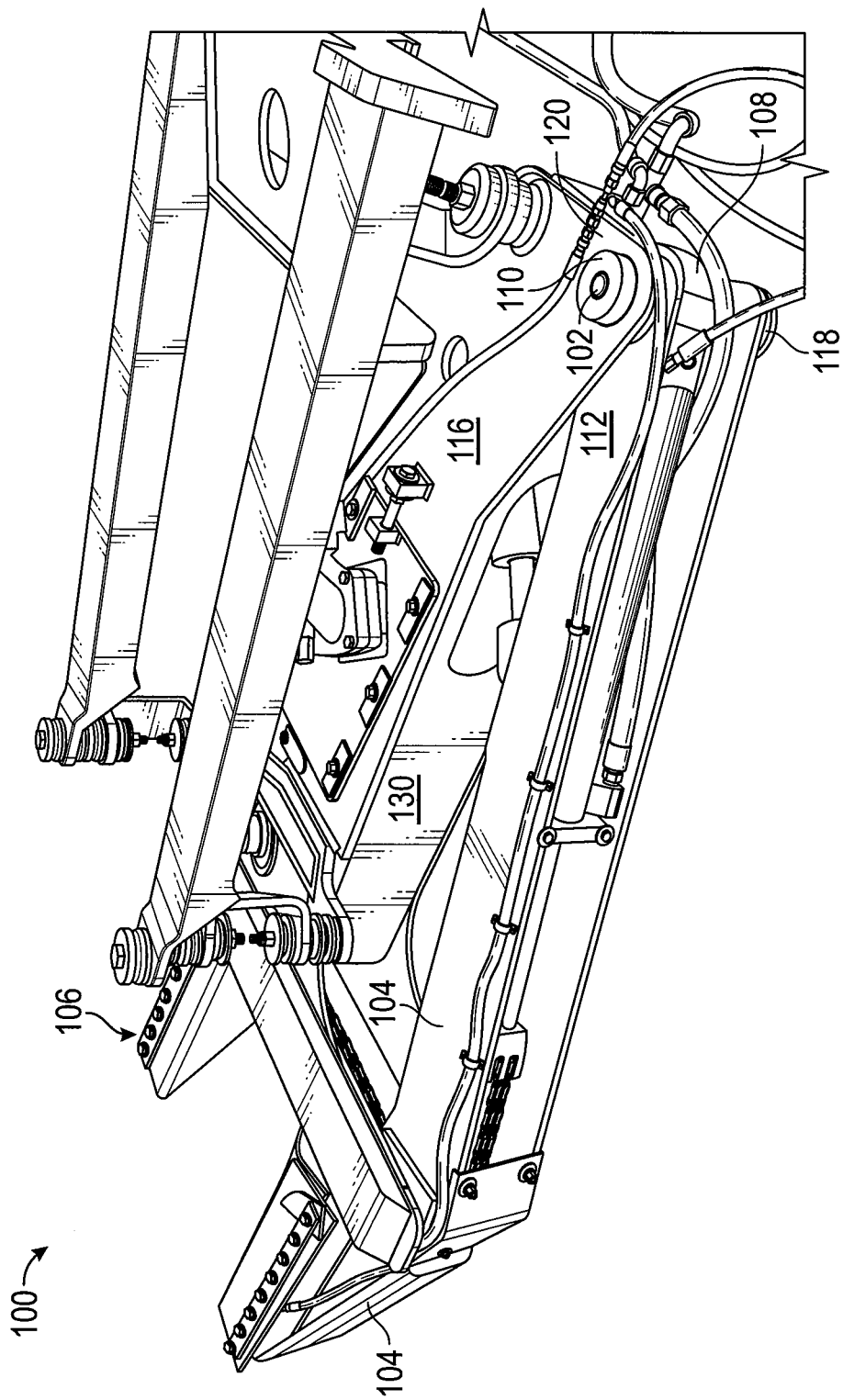
FIG. 1 depicts a prior art shaker head.
Figure 2:
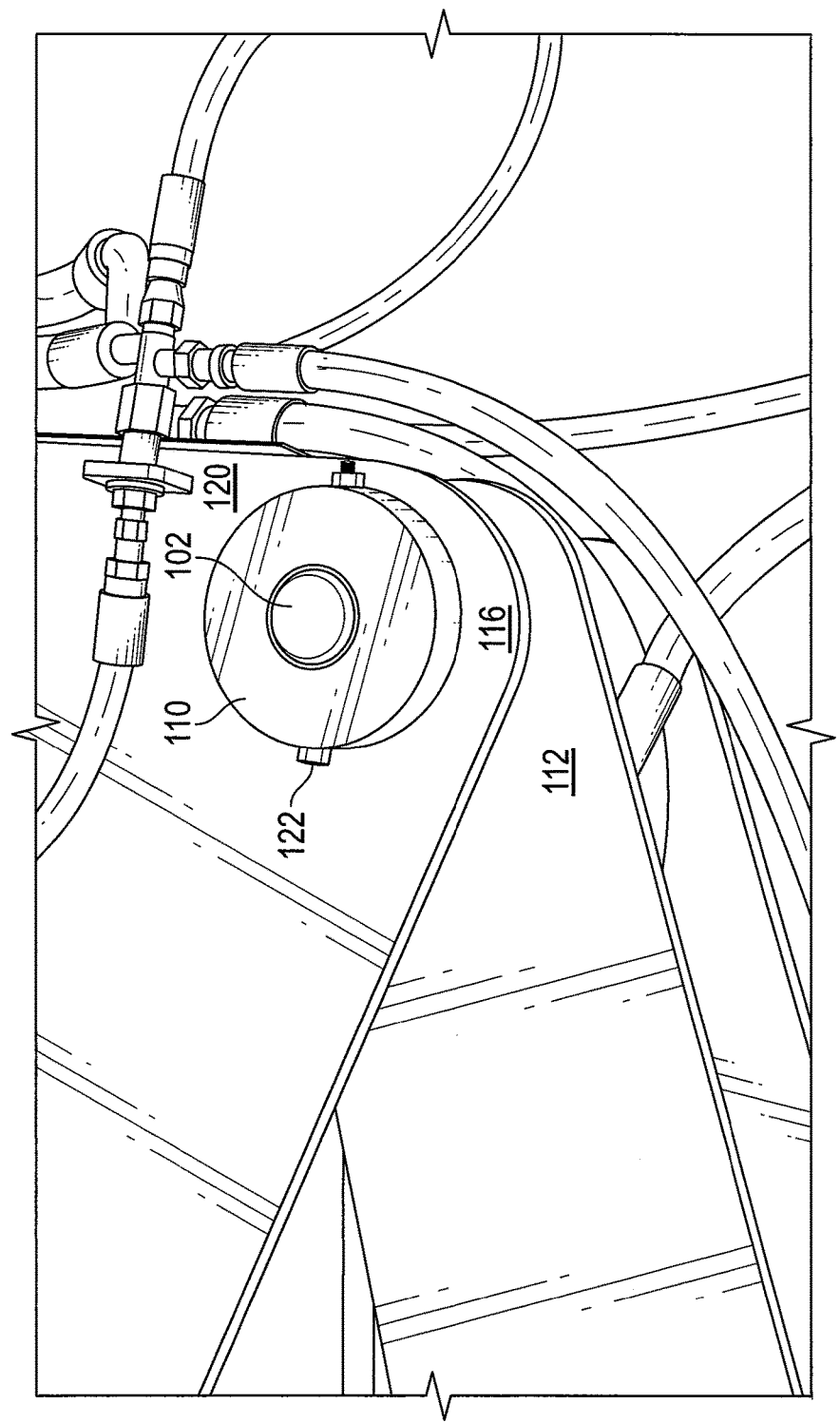
FIG. 2 depicts a close-up view of a prior art pivot pin assembly utilized in the prior art shaker head depicted in FIG. 1.

Referring now to the figures, FIGS. 1 and 2 depict a known shaker head 100. A pivot pin 102 at the rear or pivot end 120 of a frame 130 attaches the clamping arm 104 to the frame 130. Frame 130 comprises a stationary arm 106 which may be either attached or integral to frame 130. Fixed end 112 of clamping arm 104 is typically sandwiched between opposing plates 116, 118 of the frame 130 as shown in FIGS. 1 and 2. The clamping arm 104 will typically have a housing 108 through which the pivot pin 102, typically having a 1¼ inch diameter shaft, is placed. The pivot pin 102 extends completely through the housing 108 and through the opposing plates 116, 118 of the stationary arm, with a pivot pin bushing 110 retaining each end of the pivot pin 102, typically with a bolt 122 set transversely through the pivot pin bushing 110 and pivot pin 102 to secure the pivot pin 102.

Figure 3:
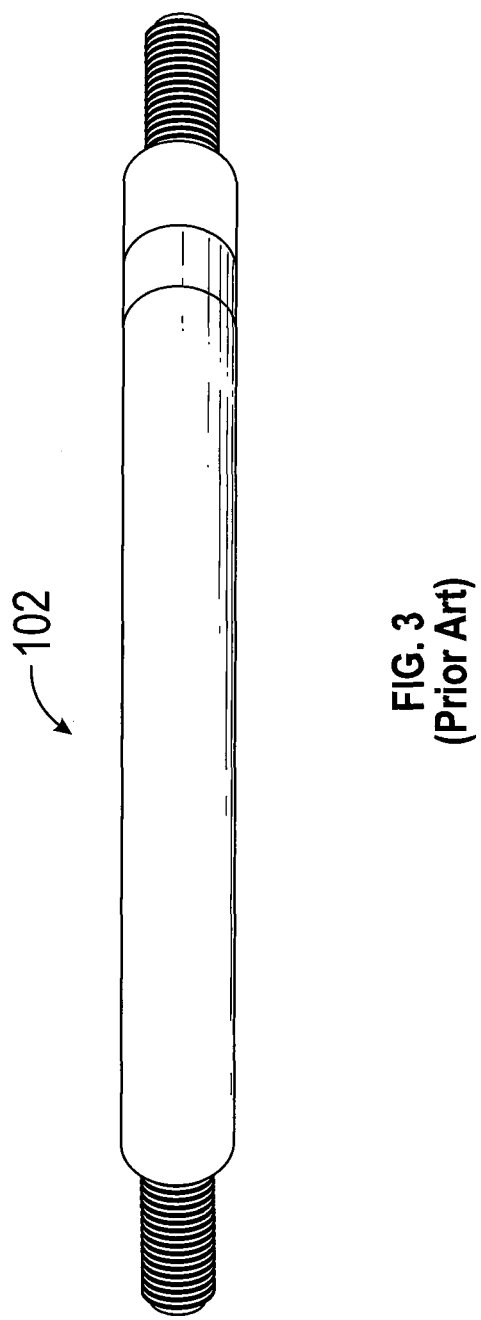
FIG. 3 depicts a pivot pin utilized in a prior art shaker head.

FIG. 3 shows pivot pin 102 removed from the shaker head 100. The pivot pin 102 from prior art shaker heads typically has a diameter of 1¼ inch. As FIG. 3 shows, the prior art pivot pin 102 comprises a solid shaft having threaded ends. If significant torque is applied to pivot pin 102 opposing plates 116, 118 will bind about fixed end 112 of the clamping arm 104 inhibiting its free rotation as clamping arm 104 is squeezed between the plates. However, the pivot pin bushing 110 in the pivot pin assembly depicted in FIGS. 2-3 is not configured to allow the application of any significant torque on pivot pin 102, so binding of the fixed end 112 of the clamping arm 104 is typically not a problem. However, because the existing systems allow flexing and movement of these various components as the shaker head 100 operates, the various shaker head components are subject to structural failure.

Figure 4:
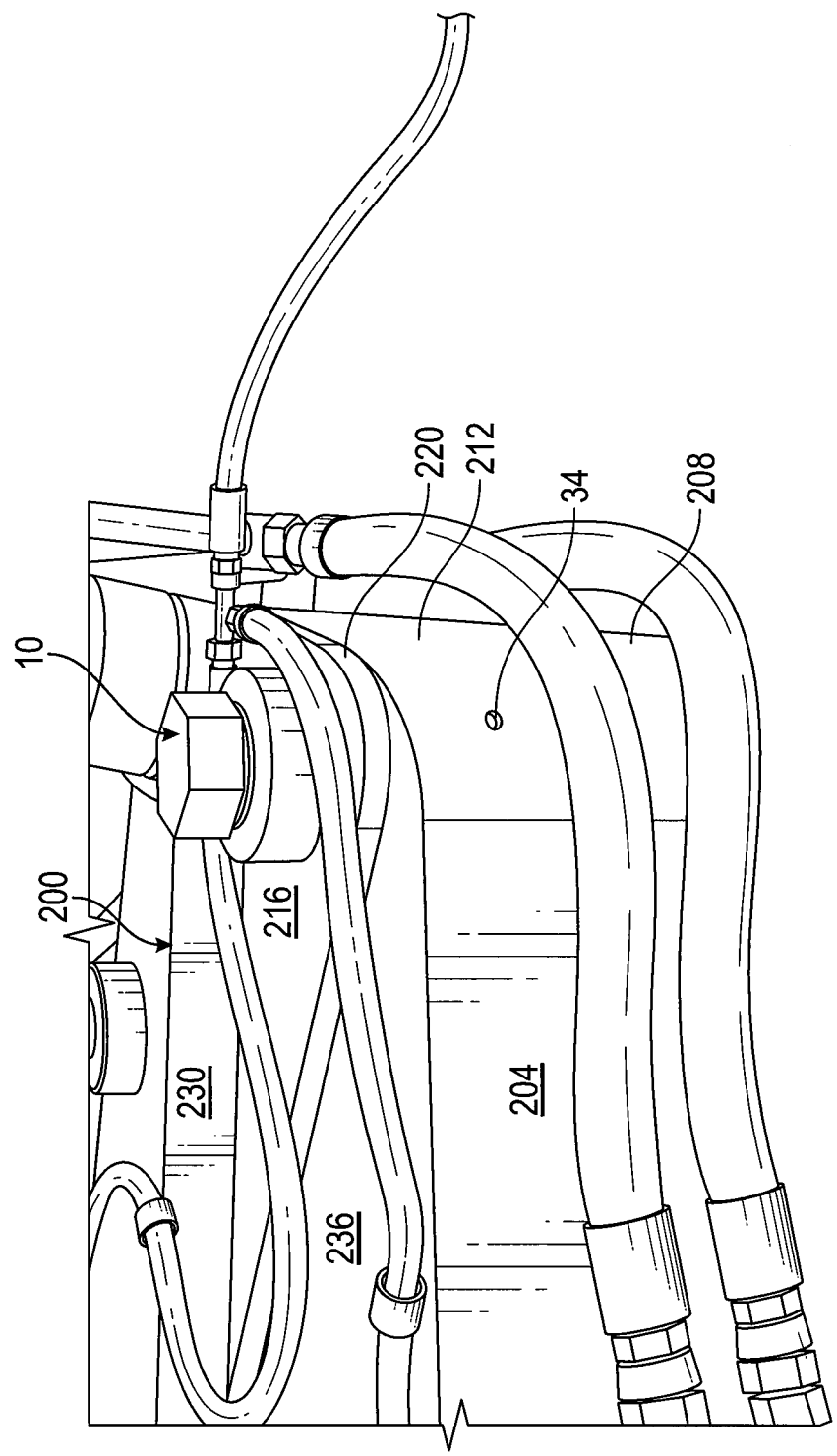
FIG. 4 shows a side view of a shaker head in which an embodiment of the presently disclosed pivot pin assembly is utilized.
Figure 5:
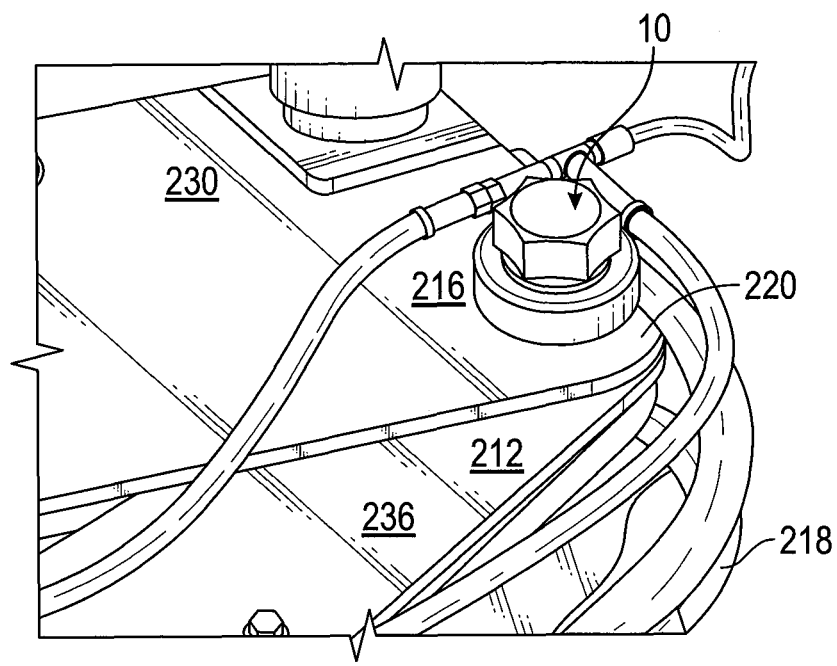
FIG. 5 shows a top view of the pivot pin assembly shown in FIG. 4.
Figure 6:
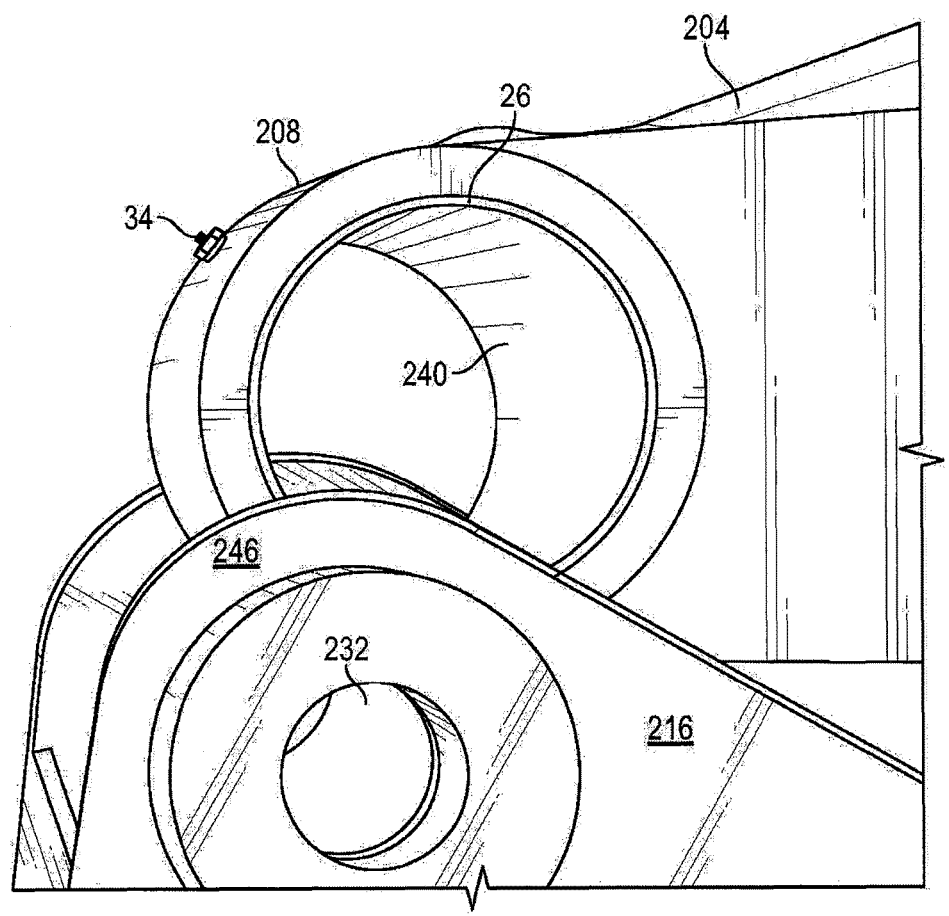
FIG. 6 shows the clamping arm partially separated from the stationary arm of a shaker head.
Figure 7:
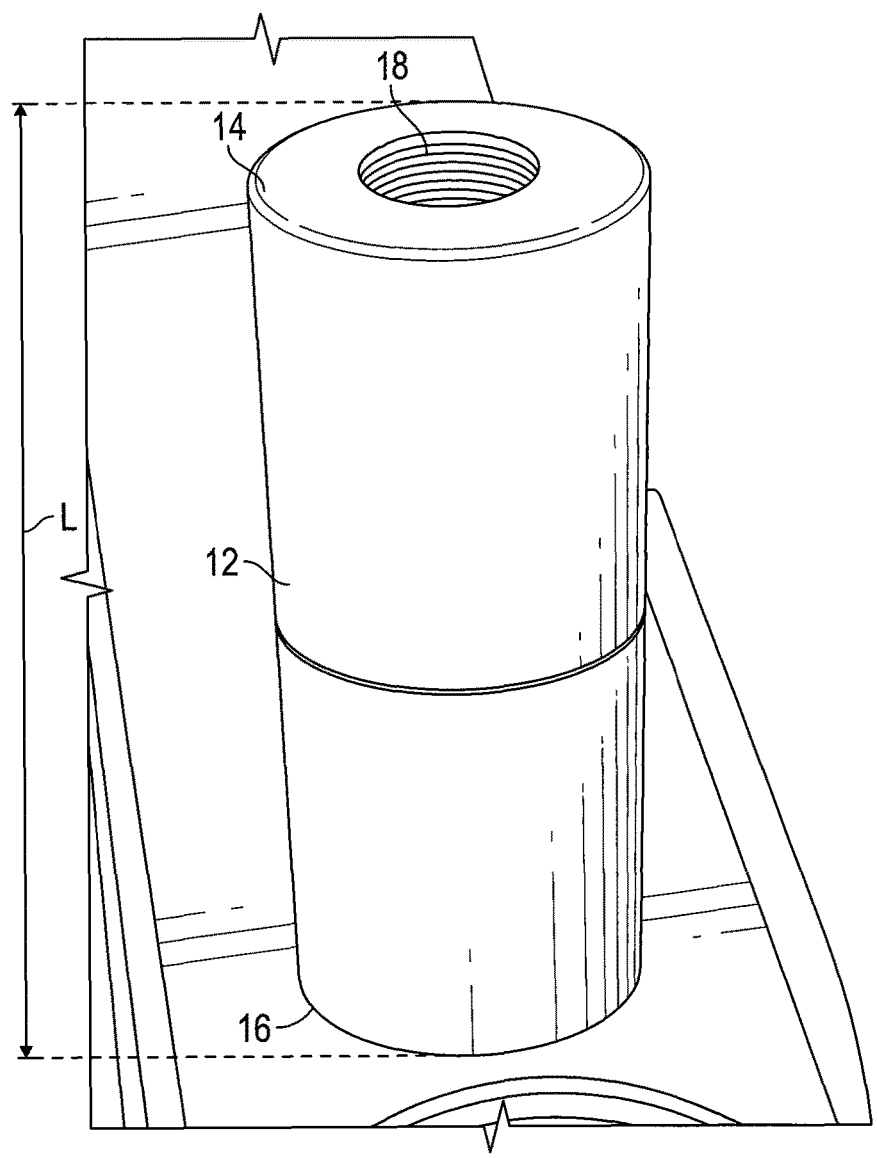
FIG. 7 shows a close-up view of an embodiment of a pivot pin of the present invention.
Figure 8:
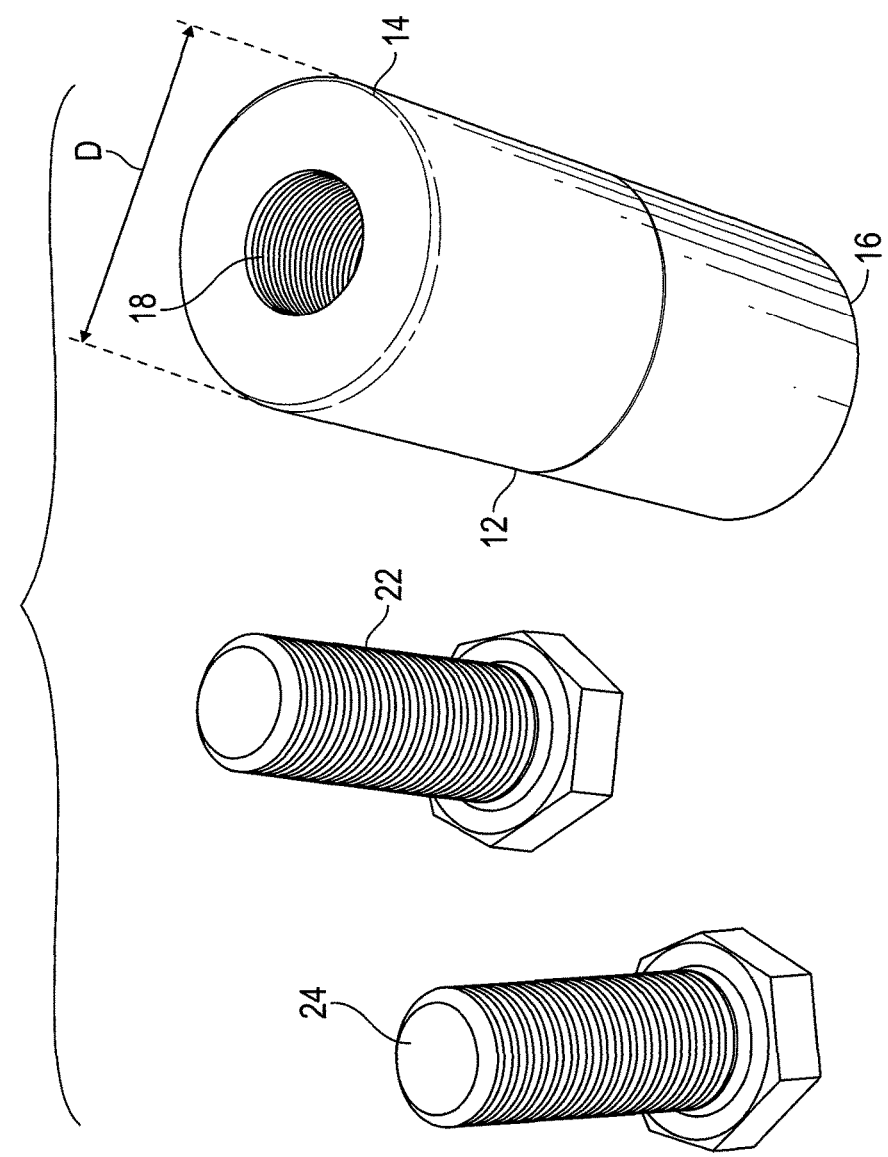
FIG. 8 shows an embodiment pivot pin of the present invention of the type utilizing threaded fasteners which make up into threaded apertures at each end of the pivot pin.
Figure 9:
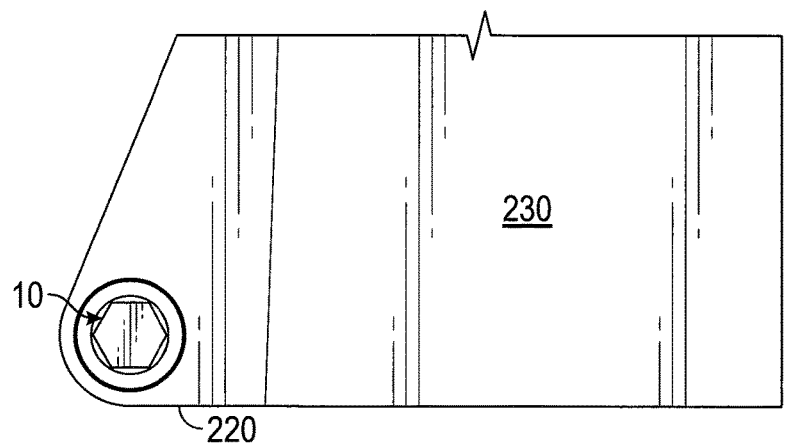
FIG. 9 shows a top view of a portion of a shaker head frame, showing the top of an embodiment of the pivot pin assembly.
Figure 10:
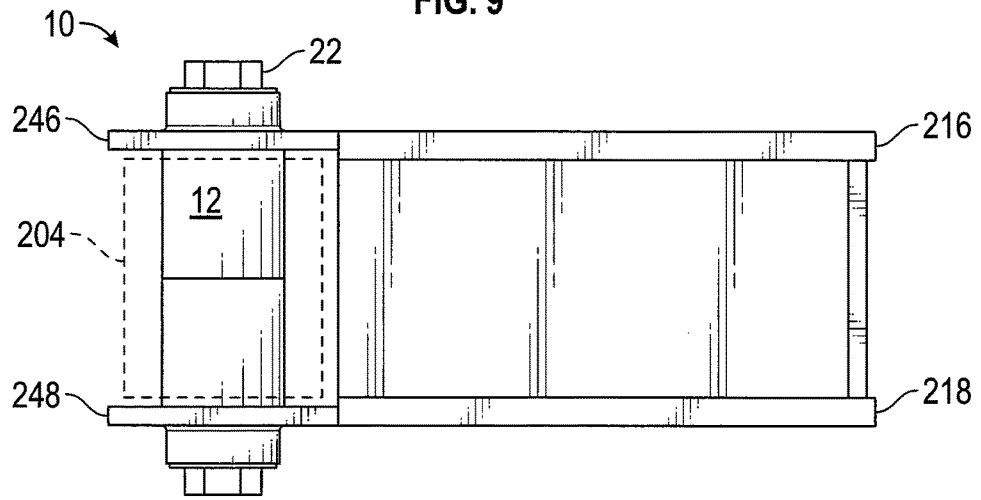
FIG. 10 shows a side view of a portion of a shaker head, showing an embodiment of the pivot pin placed between the upper plate and the lower plate of the shaker head frame and the relative position of the top plate and bottom plate of the clamping arm.

FIGS. 4-6 depict a portion of a shaker head 200 equipped with an embodiment of the present pivot pin assembly 10. The clamping arm 204 has a free end (not shown) and a fixed end 212, where the fixed end is attached to the pivot end 220 of the frame 230, so that clamping arm 204 may pivot towards stationary arm 206. The frame 230 may have case structure having an upper plate 216 and a lower plate 218, with the upper plate and the lower plate in opposite facing relation. The upper plate 216 has an upper aperture 232 extending through the upper plate. Likewise, the lower plate has a lower aperture, which is not shown, but is similar to the upper aperture 232 which extends through the lower plate 218, where the upper aperture 232 and the lower aperture are in opposite facing relation, and have the same internal diameter. Upper plate 216 and lower plate 218 may be fabricated from steel and will typically have a wall thickness of approximately ¾ inch each.

The fixed end 212 of the clamping arm 204 is pivotally attached at the pivot end 220 of the case structure 230 between the upper plate 216 and the lower plate 218. The fixed end 212 of the clamping arm 204 has an upper surface 236 and a lower surface 238. A pivot pin housing 208 is positioned between the upper surface 236 and the lower surface 238, where the pivot pin housing has a cylindrical bore 240 extending there through. The pivot pin assembly 10 has a cylindrical pivot pin 12 having a first end 14 and a second end 16. The cylindrical pivot pin 12 is sized to be disposed into the bore 240 of the cylindrical housing 208. The cylindrical pivot pin 12 has an outside diameter D which, particularly when compared with pivot pin 102 of FIG. 3, is substantially larger than the pivot pins 102 used in the prior art shaker heads 100. For example, in one embodiment of the present invention, the cylindrical pivot pin 12 may have a diameter D of 4½ inches. The cylindrical pivot pin 12 will have sufficient clearance with the inside walls of the bore 240 of the cylindrical housing 208 to allow rotation of the clamping arm 240 about the pivot pin, where pivot pin 12 does not rotate with respect to the ears 246, 248 in upper plate 216 and lower plate 218 of frame 230. A clearance between pivot pin 12 and bore 240 ranging from 2 to 4 thousandths is acceptable.

Pivot pin 12 is manufactured from high strength carbon steel. It has a first end 14 and a second end 16. In one embodiment, first end 14 of the pivot pin 12 has a first threaded aperture 18 while the second end 16 has a second threaded aperture 20. In another embodiment, pivot pin 12' has a continuous aperture 18' which extends axially from the first end 14' to the second end 16'.

Figure 11:
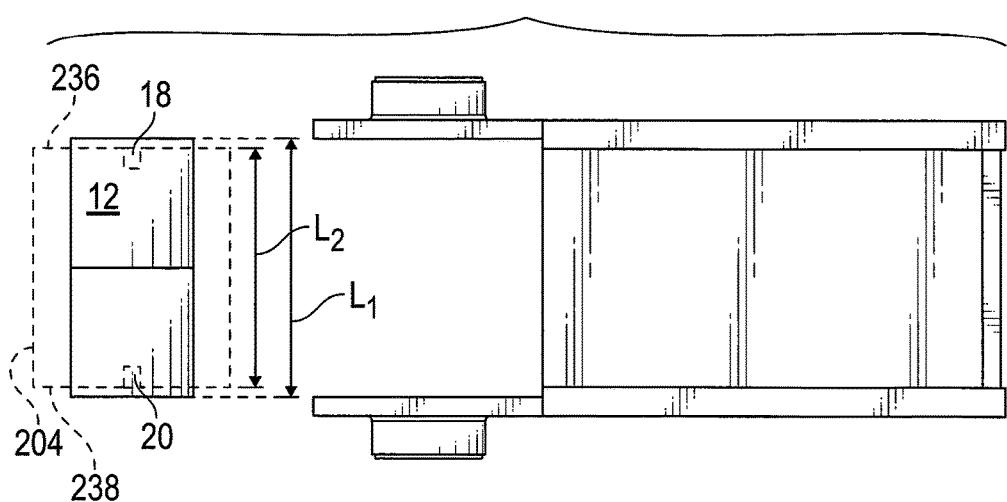
FIG. 11 shows a side view of a portion of a shaker head, showing the clamping arm and pivot pin separated from the shaker head frame.
Figure 12:
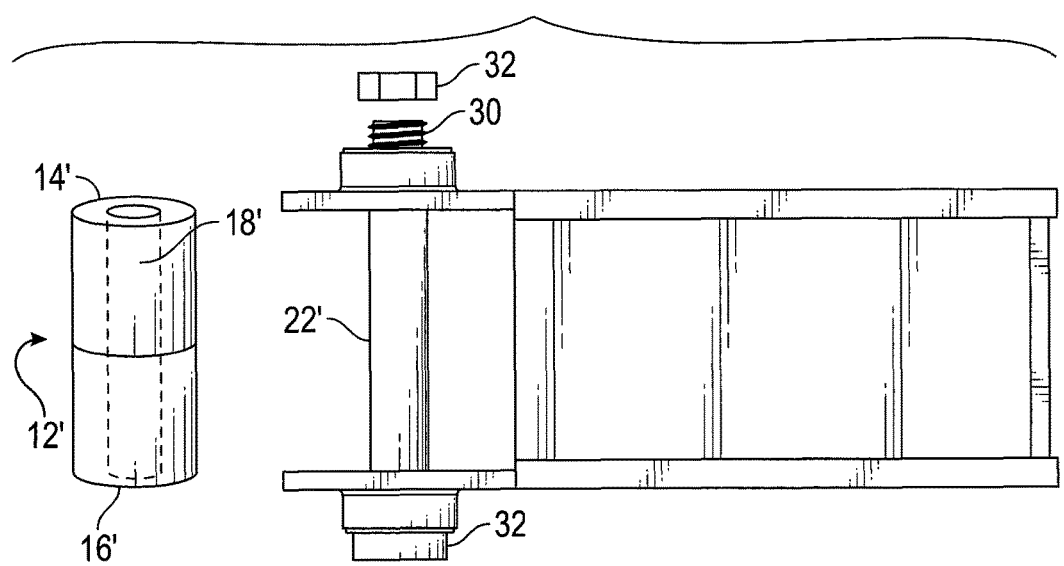
FIG. 12 shows a side view of a portion of a shaker head with the pivot pin removed, where the pivot pin is attached by a load member which extends all of the way through the pivot pin.
Figure 13:
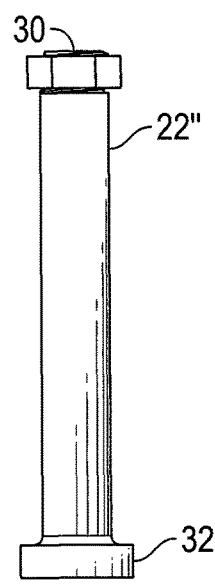
FIG. 13 shows an embodiment of a load member having a threaded end and an integral head on the opposite end.

In any embodiment, the pivot pin 12 has a length $L_1$ such that when the pivot pin 12 is disposed into the bore 240 of the cylindrical housing 208, the first end 14 extends above the upper surface 236 of the clamping arm 204 and the second end 16 extends below the lower surface 238 of the clamping arm, where the distance from upper surface 236 to lower surface 238 is $L_2$, as illustrated in FIG. 11. In other words, $L_1$ is always greater than $L_2$. Pivot pin 12 is positioned between ears 246, 248 such that when an axial load is applied to the longitudinal load member or members which hold pivot pin 12 in place, the ears 246, 248 will be supported by pivot pin 12.

For the embodiment of pivot pin 12 having a first threaded aperture 18 in first end 14 and a second threaded aperture 20 in the second end 16, a first threaded fastener 22 extends through the upper aperture 232 of the upper plate 216 and makes up into first threaded aperture 18. Likewise, a second threaded fastener 24 extends through a lower aperture of the lower plate 218 and makes up into second threaded aperture 20. Application of torque to the first threaded fastener 22 compresses the ear 246 of upper plate 216 against the first end 14 of pivot pin 12 but does not compress the clamping arm 204. As with the first threaded fastener 22, application of torque to the second threaded fastener 24 compresses the ear 248 of the lower plate 218 against the second end 16 of pivot pin 12 without compressing the clamping arm 204. As a result, substantial torque may be applied to the fasteners 22, 24 which connect the clamping arm 204 to the stationary arm 206, where application of the torque reduces play between the clamping arm and stationary arm, but application of the torque does not inhibit the free rotation of the clamping arm 204 about the pivot pin 12, which remains stationary. The first threaded fastener 22 and the second threaded fastener 24 will generally have the same diameter as the pivot pins 102 currently in use, typically ranging from 1¼ to 1½ inch.

In another embodiment of the invention 10, the pivot pin 12' may have a continuous aperture 18' which extends through the longitudinal axis of the pivot pin from the first end 14' to the second end 16'. In this embodiment, a longitudinal load member 22' extends through the upper aperture 232 of the upper plate 216, through the continuous aperture 18' and extends through a lower aperture of the lower plate 218. In this embodiment longitudinal load member 22' will have a threaded end 30 to which end a nut 32 may be applied. The opposite end 32 of longitudinal load member 22' may be threaded for receipt of a nut. Alternatively, end 32 may have other means for retaining it, such as a pin inserted through an aperture extending diametrically through an end of the longitudinal load member 22', a welded washer or plate attached at one end of the longitudinal load member, a retaining clip or a taper bushing which attaches to an end of the longitudinal load member. Alternatively, one end or both ends of the longitudinal load member may have a threaded aperture which receives a threaded fastener. As with the embodiment of the pivot pin 12 described above, application of a load to the longitudinal load member 22' compresses the ear 246 of upper plate 216 against the first end 14 of pivot pin 12' but does not compress the clamping arm 204.

In another embodiment of the invention 10, a wear bushing 26 may be disposed between the pivot pin 12 and the bore 240 of the cylindrical housing 208. This wear bushing 26 will typically be fabricated from a softer material, such as brass, and will have a wall thickness ranging from ⅛ to ¼ inch. The wear bushing 26 will typically be press fit into the bore 240 of the cylindrical housing 208. A grease fitting 34 may be installed through cylindrical housing 208 to allow the placement of grease between the contact surfaces of the clamping arm 204, including wear bushing 26, and pivot pin 12.

Embodiments of the present invention may further comprise methods of attaching a clamping arm 204 to a stationary arm 206 of a tree shaker.

Having thus described the preferred embodiment of the invention, what is claimed as new and desired to be protected by Letters Patent includes the following:

1. In a shaker head comprising a frame and clamping arm wherein the frame comprises an upper plate and a lower plate and the clamping arm is pivotally attached to the frame, wherein the clamping arm comprises a top surface and a bottom surface, and a first length is defined by the distance from the top surface to the bottom surface, a pivot pin assembly for pivotally attaching the clamping arm to the frame comprises:
   a cylindrical pivot pin having a first end and a second end, the pivot pin further comprising a first aperture in the first end, where the cylindrical pivot pin extends through a top aperture in the top surface and the cylindrical pivot pin extends through a bottom aperture in the bottom surface, where a second length is defined by the distance from the first end to the second end, wherein the second length is greater than the first length; and
   a longitudinal load member which extends through an upper aperture in the upper plate and into the first aperture wherein application of an axial load in the longitudinal load member compresses the upper plate against the first end of the cylindrical pivot pin without compressing the clamping arm.

2. The pivot pin assembly of claim 1 wherein the first aperture extends through the cylindrical pivot pin from the first end to the second end.

3. The pivot pin assembly of claim 2 wherein the longitudinal load member extends through the cylindrical pivot pin from the first end to the second end.

4. The pivot pin assembly of claim 3 wherein the longitudinal load member comprises threads.

5. The pivot pin assembly of claim 4 wherein the longitudinal load member comprises a nut made up on the threads.

6. The pivot pin assembly of claim 4 wherein the longitudinal load member comprises a hexagonal head.

7. The pivot pin assembly of claim 1 further comprising a second aperture in the second end of the cylindrical pivot pin wherein the first aperture and the second aperture are in axial alignment but do not penetrate through the cylindrical pivot pin.

8. The pivot pin assembly of claim 7 wherein the first aperture and the second aperture comprise a plurality of internal threads.

9. In a shaker head comprising a frame and clamping arm wherein the frame comprises an upper plate and a lower plate and the clamping arm is pivotally attached to the frame, wherein the clamping arm comprises a top surface and a bottom surface and a first length is defined by the distance from the top surface to the bottom surface, a pivot pin assembly for pivotally attaching the clamping arm to the frame comprises:
   a cylindrical pivot pin having a first end with a first threaded aperture and a second end with a second threaded aperture, where the cylindrical pivot pin extends through a top aperture in the top surface and the cylindrical pivot pin extends through a bottom aperture in the bottom surface, where a second length is defined by the distance from the first end to the second end, wherein the second length is greater than the first length; and
   a first threaded fastener which extends through an upper aperture in the upper plate and makes up into the first threaded aperture wherein application of a first torque to the first threaded fastener compresses the upper plate against the first end of the cylindrical pivot pin without compressing the top surface.

10. The pivot pin assembly of claim 9 wherein the cylindrical pivot pin comprises a second threaded fastener which extends through a lower aperture of the lower plate and makes up into the second threaded aperture wherein application of a second torque to the second threaded fastener compresses the lower plate against the second end of the cylindrical pivot pin without compressing the bottom surface.

11. The pivot pin assembly of claim 9 further comprising a first wear bushing disposed between the cylindrical pivot pin and the top aperture.

12. The pivot pin assembly of claim 10 further comprising a second wear bushing disposed between the cylindrical pivot pin and the bottom plate aperture.

13. The pivot pin assembly of claim 11 wherein the clearance between the cylindrical pivot pin and the first wear bushing ranges from 2 to 4 thousandths of an inch.

14. The pivot pin assembly of claim 9 wherein the first torque is approximately 2,500 lb-ft.

15. The pivot pin assembly of claim 9 wherein the cylindrical pivot pin has a diameter of approximately 3 inches.

16. The pivot pin assembly of claim 9 wherein the first threaded fastener has a diameter of approximately 1 inch.

17. In a shaker head comprising a clamping arm and a stationary arm, wherein the clamping arm comprises a fixed end pivotally attached to the stationary arm, wherein the stationary arm is integral to a frame having a case structure comprising an upper plate and a lower plate, the upper plate and the lower plate in opposite facing relation, the upper plate having an upper plate aperture having an upper plate aperture diameter and the lower plate having a lower plate aperture having a lower plate aperture diameter, the clamping arm comprising a top surface and top surface aperture having a top surface aperture diameter, the clamping arm further comprising a bottom surface and a bottom surface aperture having a bottom surface aperture diameter, wherein the clamping arm is pivotally attached to the frame by a pivot pin assembly comprising:

- a cylindrical pivot pin having a cylindrical pivot pin diameter, the cylindrical pivot pin diameter larger than the upper plate aperture diameter and the lower plate aperture diameter but smaller than the top surface aperture diameter and the bottom surface aperture diameter, the cylindrical pivot pin further comprising a first end and a second end, the first end of the cylindrical pivot pin having a first end aperture wherein the cylindrical pivot pin is disposed into the top surface aperture with the first end extending above the top surface and the cylindrical pivot pin is disposed into the bottom surface aperture with the second end extending below the bottom surface; and
- a longitudinal load member which extends through the upper plate aperture and into the first end aperture wherein application of an axial load in the longitudinal load member compresses the upper plate against the first end of the cylindrical pivot pin without compressing the top surface.

18. The pivot pin assembly of claim 17 wherein application of a first torque to the first threaded fastener does not compress the top plate.

19. The pivot pin assembly of claim 17 wherein the top plate aperture is lined with a first wear bushing which is disposed between the cylindrical pivot pin and the top plate aperture.

20. The pivot pin assembly of claim 19 wherein the clearance between the cylindrical pivot pin and the first wear bushing ranges from 2 to 4 thousandths of an inch.

21. The pivot pin assembly of claim 18 wherein the first torque is approximately 2,500 lb-ft.

22. The pivot pin assembly of claim 17 wherein the cylindrical pivot pin has a diameter of approximately 3 inches.

23. The pivot pin assembly of claim 17 wherein the first threaded fastener has a diameter of approximately 1 inch.

24. The pivot pin assembly of claim 17 wherein a first length is defined from the top surface to the bottom surface and a second length is defined from the first end to the second end, and the second length is greater than the first length.

* * * * *